(12) United States Patent
Junge

(10) Patent No.: US 11,474,350 B2
(45) Date of Patent: Oct. 18, 2022

(54) HEAD-UP DISPLAY

(71) Applicant: Continental Automotive GmbH, Hannover (DE)

(72) Inventor: Christian Junge, Hannover (DE)

(73) Assignee: Continental Automotive GmbH

(*) Notice: Subject to any disclaimer, the term of this patent is extended or adjusted under 35 U.S.C. 154(b) by 121 days.

(21) Appl. No.: 16/655,960

(22) Filed: Oct. 17, 2019

(65) Prior Publication Data

US 2020/0049986 A1    Feb. 13, 2020

Related U.S. Application Data

(63) Continuation of application No. PCT/EP2018/057039, filed on Mar. 20, 2018.

(30) Foreign Application Priority Data

Apr. 19, 2017 (DE) .................. 10 2017 206 544.3

(51) Int. Cl.
*G02B 27/01* (2006.01)
*G02B 5/20* (2006.01)
*G02B 5/26* (2006.01)
*G02B 27/28* (2006.01)

(52) U.S. Cl.
CPC ......... *G02B 27/0101* (2013.01); *G02B 5/208* (2013.01); *G02B 5/26* (2013.01); *G02B 27/288* (2013.01); *G02B 2027/0118* (2013.01)

(58) Field of Classification Search
CPC ...... G02B 27/0101; G02B 5/208; G02B 5/26; G02B 27/288; G02B 2027/0118; G02B 5/3033; G02B 27/01; G02B 27/28; G02B 5/20; G02B 5/30
See application file for complete search history.

(56) References Cited

U.S. PATENT DOCUMENTS

| 4,984,872 | A |   | 1/1991 | Vick |
| 5,552,935 | A | * | 9/1996 | Knoll ................. B60Q 3/12 359/13 |
| 5,598,175 | A | * | 1/1997 | Iino ................... B60K 35/00 359/13 |

(Continued)

FOREIGN PATENT DOCUMENTS

| DE | 102005020233 A1 | 11/2006 |
| DE | 102011014145 A1 | 6/2012 |

(Continued)

OTHER PUBLICATIONS

Office Action dated Dec. 11, 2017 from corresponding German Patent Application No. DE 10 2017 206 544.3.

(Continued)

*Primary Examiner* — Balram T Parbadia

(57) ABSTRACT

A head-up display comprises an image-generating unit which is protected from damage caused by incident light from the outside, a corresponding mirror element, and a method for the manufacture of the head-up display. The head-up display comprises an image-generating unit, a deflection unit and a mirror unit. The deflection unit comprises a mirror element that comprises a spectrally partially reflecting layer, disposed on a substrate, on which an absorptive polarization layer is disposed.

18 Claims, 2 Drawing Sheets

(56) References Cited

U.S. PATENT DOCUMENTS

| | | | |
|---|---|---|---|
| 8,422,112 B2* | 4/2013 | Li | G02B 27/0101 |
| | | | 359/251 |
| 9,423,615 B2 | 8/2016 | Sato et al. | |
| 9,606,355 B2* | 3/2017 | Larson | G02B 27/281 |
| 10,393,935 B2 | 8/2019 | Finger | |
| 2012/0099170 A1* | 4/2012 | Shikii | H04N 9/3161 |
| | | | 359/13 |
| 2013/0077156 A1 | 3/2013 | Karasawa | |
| 2013/0279016 A1* | 10/2013 | Finger | G02B 5/3066 |
| | | | 359/630 |
| 2014/0152711 A1* | 6/2014 | Sekiya | H04N 9/3194 |
| | | | 345/690 |
| 2014/0253821 A1 | 9/2014 | Fakatoh et al. | |
| 2015/0098029 A1* | 4/2015 | Sato | G02F 1/133555 |
| | | | 349/11 |
| 2016/0091716 A1* | 3/2016 | Larson | G02B 27/0101 |
| | | | 359/631 |
| 2017/0139206 A1* | 5/2017 | Sugikawa | G02B 5/0833 |
| 2017/0235030 A1* | 8/2017 | Tanaka | G02B 27/0101 |
| | | | 349/11 |
| 2017/0315352 A1* | 11/2017 | Hardy | G02B 27/0101 |
| 2018/0081172 A1 | 3/2018 | Liu et al. | |
| 2018/0143351 A1* | 5/2018 | Lin | G02B 1/11 |
| 2018/0164585 A1* | 6/2018 | Nambara | G02B 27/283 |
| 2018/0180878 A1 | 6/2018 | Yokoe et al. | |
| 2018/0210201 A1* | 7/2018 | Togasaki | G02F 1/133606 |
| 2018/0348515 A1* | 12/2018 | Kuzuhara | B60K 37/04 |
| 2019/0049725 A1* | 2/2019 | Kondo | G02B 27/0101 |
| 2019/0227308 A1* | 7/2019 | Yokoe | G02B 27/01 |
| 2020/0026073 A1* | 1/2020 | Nambara | G03B 21/28 |

FOREIGN PATENT DOCUMENTS

| | | |
|---|---|---|
| JP | 2003344801 A | 12/2003 |
| JP | 2014191321 A | 10/2014 |
| JP | 2015007763 A | 1/2015 |
| JP | 2015222337 A | 12/2015 |
| WO | 2016/157815 A1 | 10/2016 |
| WO | 2016/208133 A1 | 12/2016 |

OTHER PUBLICATIONS

International Search Report and Written Opinion dated Jul. 4, 2018 from corresponding International Patent Application No. PCT/EP2018/057039.

Japanese Office Action dated Nov. 12, 2020 for the counterpart Japanese Patent Application No. 2019-556945.

* cited by examiner

HEAD-UP DISPLAY

CROSS-REFERENCE TO RELATED APPLICATIONS

This application claims the benefit of PCT Application PCT/EP2018/057039, filed Mar. 20, 2018, which claims priority to German Application DE 10 2017 206 544.3, filed Apr. 19, 2017. The disclosures of the above applications are incorporated herein by reference.

TECHNICAL FIELD

The present invention relates to a head-up display in which a display unit is protected from damage caused by incident light from the outside, a corresponding mirror element, and a method for its manufacture.

BACKGROUND

A head-up display generates a virtual image in the windshield that is visible to the driver. This image is usually generated on a display unit, for example a liquid-crystal display (LCD), and reflected to the windshield through a hole in the instrument panel by means of mirrors. It is often necessary to protect the display unit from, among other things, overheating.

A known head-up display with an image-generating unit, a deflection unit and a mirror unit. The head-up display comprises in addition a polarization layer arranged between the deflection unit and the mirror unit. As a result, only stray light of one polarization orientation incident from the outside reaches the image-generating unit, whereas about half of the incident light power is stopped by the polarization layer. However, an additional element, the polarization layer, is to be arranged. This, moreover, only offers protection with regard to one polarization orientation, whereas about half of the incident interfering light reaches the image-generating unit and can thus damage it.

Another known head-up display has an image-generating unit, a deflection unit and a mirror unit. The deflection unit here comprises a spectrally partially reflecting mirror that does not reflect the infra-red (IR) component of the light, but allows it to pass. An IR sensor arranged behind the mirror detects the intensity of the light that is allowed through. If this is too high, the power of the light source of the image-generating unit is thus reduced or completely switched off. However, the head-up display is not available to the driver in many situations, since it is switched off due to the risk of overheating. Or it is not available to the full extent if the power of the light source is reduced.

Therefore, an image-generating unit which from damage from interfering light, sunlight in particular, incident on the head-up display from outside is desired. The damage primarily occurs due to the development of heat, i.e. as a result of the long-wave IR component of the light, and through absorption and conversion of components with other wavelengths into heat. Damage caused by the short-wave UV component should also be reduced.

SUMMARY

A head-up display comprises an image-generating unit, a deflection unit and a mirror unit. The deflection unit comprises a mirror element that comprises a spectrally partially reflecting layer, disposed on a substrate, on which an absorptive polarization layer is disposed that allows through light that has the same polarization orientation as the polarization layer, and absorbs light of a different polarization.

The image-generating unit here is, for example, a liquid-crystal display, a display based on LEDs or OLEDs, based on micro-mirrors, or based on other appropriate image generating technologies. Overheating leads to the destruction of liquid-crystal displays in particular. At least it impairs their operation. The displays according to other technologies are also negatively affected by too much incoming light radiation. The deflection unit guides the light from the image-generating unit to a mirror unit at which the image of the image-generating unit is overlaid with an image of the surroundings, and the overlaid images are projected into the eye of a driver of the vehicle in which the head-up display is located.

Accordingly, the function of the spectrally partially reflecting layer and the function of the polarizing layer are combined into a single component which additionally performs the function of a mirror of the deflection unit of the head-up display. An increased protection against the development of heat is achieved through this double measure without greater outlay being required for assembly, since no additional part is involved.

Further, multiple functions are enabled without increasing the number of optical boundary surfaces. Every optical boundary surface entails reflections, light refraction etc. which, considered individually, bring about a slight impairment of the virtual image perceived by the driver but in total impair the quality of the image, so making countermeasures necessary, which increases the complexity and the manufacturing costs of the head-up display.

Unwanted reflections that are perceived as disruptive by the observer can even occur with a single optical boundary surface. Each further optical boundary surface can give rise to further unwanted reflections. Since in the mirror element according to the invention a polarizing layer is disposed on the reflecting layer and parallel to it, no additional disturbing reflections occur here.

The mirror element may be an absorptive polarizer. Two types of polarizer are distinguished, depending on how the polarization separation occurs. There are reflecting polarizers that decompose the incident, unpolarized light into a reflected polarization component and a transmitted component. The transmitted component can also here contain components of the reflected polarization orientation. The known wire-grid polarizers are an example of reflecting polarizers.

There are, furthermore, absorptive polarizers that absorb one polarization component from unpolarized light and transmit the other, for example with the aid of appropriately aligned molecules. The type of polarization separation is thus definitive for the type of the polarizer. The application of a further absorptive layer, the polarization layer, onto a mirror is in this arrangement crossed by light twice, which doubles its effective thickness. Therefore, even a relatively thin absorptive polarization layer is thus sufficient to achieve an adequate reduction in the unwanted polarization component.

The spectrally partially reflecting layer has a bandpass characteristic. Preferably the visible components of the light, i.e. wavelengths between about 400 nm and about 800 nm are reflected, while the infra-red components with wavelengths greater than about 800 nm are allowed through as well as the UV component with wavelengths below about 400 nm. Thus, only the visible component reaches the image-generating unit. The heat-generating, long-wave infra-red component passes through the spectrally partially reflecting layer, and generates heat at another location at which it cannot damage the image-generating unit. A corresponding consideration applies to the short-wave ultraviolet component.

The spectrally partially reflecting layer to a large extent only reflects in those wavebands that are generated by the image-generating unit. Therefore, providing wavelength-selective light generation of the image-generating unit. For example if this is based on laser light sources or other narrow-band light sources, an even smaller component of the interfering light in this way reaches the image-generating unit, while the other wavelength ranges pass through the spectrally partially reflecting layer and do not reach the image-generating unit. Light beams generated by the image-generating unit, on the other hand, are reflected by the spectrally selectively reflecting layer order to generate the virtual image to be perceived by the driver.

The substrate has a plane surface onto which the spectrally partially reflecting layer is vapor-deposited. The polarization layer here is a membrane that is laminated onto the spectrally partially reflecting layer. Therefore, only a single component is involved here which can, moreover, be manufactured economically. A substrate with a flat surface is more easily manufactured than one with a curved surface. Plate glass from large-scale production can, for example, be used here. Vapor deposition onto plane surfaces is a proven process that runs reliably and with almost no scrap.

The polarization layer, designed as a membrane, can particularly easily and reliably be laminated onto the plane, vapor-deposited surface. If a curved surface of the mirror element is desired, for example to compensate for the surface curvature of a windshield functioning as mirror unit, an appropriate membrane can also be applied thereto. While this does require a greater outlay than a plane surface, it can however pay off since a further element that is otherwise necessary to compensate for the curvature is saved.

In another embodiment, the substrate is designed to be opaque. Dark plastic, metal, a ceramic element or colored glass is, for example, used for this purpose. If the substrate is opaque, this results in the infra-red component that passes through the spectrally partially reflecting layer being absorbed by the substrate, causing it to heat up. The absorptive polarization layer also heats up due to the absorption of light of the polarization orientation that is not passed through. The mirror element thus heats up relatively evenly, which reduces stresses between the substrate and the layers disposed on it resulting from thermal expansion, and thus increases the service life of the mirror element.

As an alternative to this, the substrate is designed to be transparent or partially transparent. This, however, has the result that the light that is allowed through falls onto other components, and that these heat up or that the heat is reflected from these.

The substrate may have a large mass. A solid metal block is, for example, provided for this purpose, consisting for example of aluminum, which has a high thermal conductivity. The solid metal block can also consist of copper, which, in addition to a high thermal conductivity, also has a higher specific thermal capacity than aluminum. A suitable plastic material can also advantageously be employed here. A glass substrate of an appropriately large mass also comes into consideration.

A substrate having a large mass can absorb a larger quantity of heat without itself overheating or exposing fastening elements to which it is fastened in the head-up display to too much heat stress. The large mass moreover also ensures a thermal inertia when the temperature changes, so that only slow changes in the temperature of the mirror element occur even in the presence of briefly occurring, strong changes in the amount of incident light. Stresses resulting from thermal expansion that might occur thus remain small. This increases the service life of the mirror element and ensures that the optical properties of the mirror element remain constant. The optical quality of the head-up display that can be perceived by the driver thus does not suffer from rapidly varying quantities of incident light from outside.

A method for the manufacture of a head-up display comprises the following steps. A substrate with a plane surface is first provided. A spectrally partially reflecting layer is then vapor-deposited onto the surface of the substrate. An absorptive polarization layer is subsequently laminated as a membrane onto the spectrally partially reflecting layer. The mirror element obtained in this way is incorporated into a deflection unit of the head-up display. The insertion can take place here in a stepped manner, namely first into a deflection unit which then subsequently is integrated as a module into the head-up display. The mirror element can also be inserted directly into a head-up display that is pre-assembled with the exception of the mirror element, or in an intermediate stage thereof.

A mirror element may be designed and provided to be used in a head-up display according to one of the preceding claims regarding a head-up display. Such a mirror element, with the combination of spectrally partially reflecting layer and polarization layer, is used in the deflection unit of a head-up display.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

Further configurations of the invention and their advantages are also given in the following description on the basis of exemplary embodiments. In the drawings.

DETAILED DESCRIPTION

Figure 1:
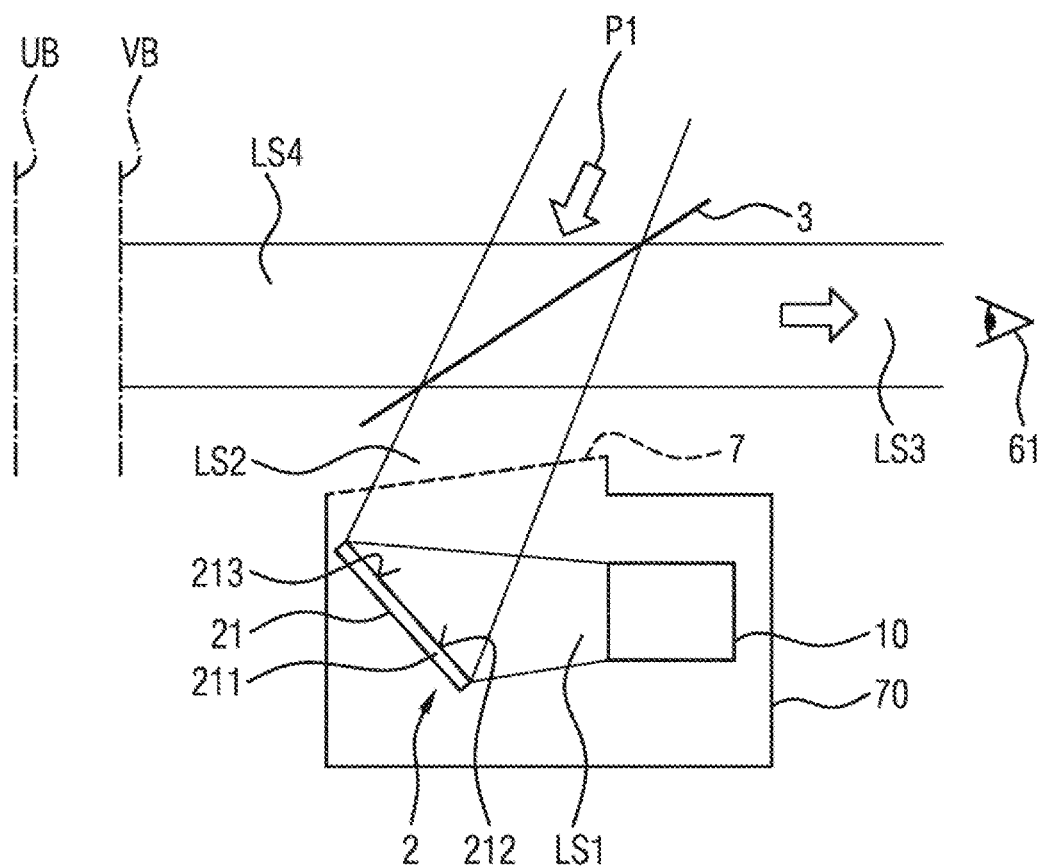
FIG. 1 shows a head-up display.

FIG. 1 shows a first embodiment of a head-up display with an image-generating unit 10, a deflection unit 2 and a mirror unit 3. The deflection unit 2 comprises a mirror element 21. A spectrally partially reflecting layer 212 and a polarization layer 213 are arranged on a substrate 211 of the mirror element 21. The two layers 212 and 213 are so thin that they cannot be distinguished in this illustration. An output opening 7 in the housing 70 of the head-up display can furthermore be seen. The outlet opening 7 is shown with a dotted line; a polarization layer is arranged there in some head-up displays according to the prior art.

The image-generating unit 10 generates an image from which light beams LS1 that are reflected by the mirror element 21 emerge. The reflected light beams LS2 reach the mirror unit 3, for example the windshield of a vehicle or a so-called combiner arranged between the windshield and the driver. They are reflected from there as light beams LS3 in the direction of the eye 61 of the driver. The image generated by the image generating unit 10 appears to the driver to float in front of the vehicle as a virtual image VB. It appears to the driver to be overlaid on the surroundings image UB of the surroundings. The light beams LS4 thus do not exist in reality, but are interpreted by the driver as coming from the virtual image VB.

Sunlight, suggested by the arrow P1, can be seen coming from above, and falls along an extension of the light beams LS2, in the direction opposite to them, onto the mirror unit 3. The mirror unit 3 is partially transparent, for example in order to allow the surroundings image UB through and to enable view of traffic events to the driver of the vehicle. The unwanted sunlight which, under certain conditions, falls onto the mirror unit 3 at the angle illustrated here passes through this, is reflected by the mirror element 21 in the direction of the image-generating unit 10 and can cause impairments there such as, for example, an overheated liquid-crystal display which thereby ages quickly and, in the extreme case, is even destroyed.

Figure 2:
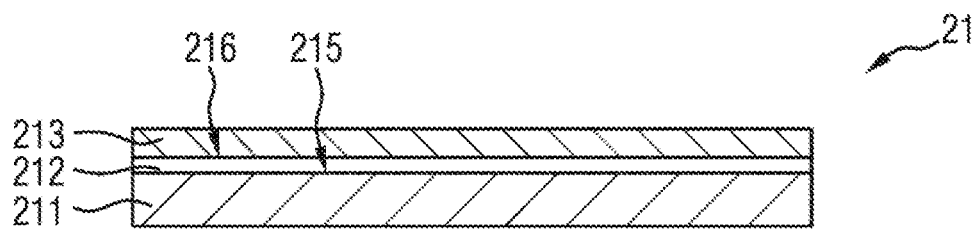
FIG. 2 shows a mirror element.

FIG. 2 shows an enlarged, cutaway illustration of the mirror element 21. The thickness relationships illustrated here are not to scale. The substrate 211, the spectrally partially reflecting layer 212 disposed on top, and the polarization layer 213 disposed on top of that can be recognized. The substrate 211 has a plane surface 215 onto which the spectrally partially reflecting layer 212 is vapor-deposited. The layer 212 has a relatively even thickness, so that its surface 216 is also plane. The polarization layer 213 present as a membrane is laminated onto the surface 216 of the spectrally partially reflecting layer 212.

When light falls onto the polarization layer 213, only the component of the light that has the same polarization orientation as the polarization layer 213 is thus passed through. Components with another polarization are not passed through by the polarization layer and are absorbed by said polarization layer. A high proportion of the sunlight incident in the direction of the arrow P1 is absorbed in this way. After passing through the polarization layer 213, the incident light is partially reflected at the spectrally partially reflecting layer 212, while the other part is passed through. The infra-red components and the UV components of the incident light are passed through. Only the visible light is reflected, and then passes through the polarization layer 213. It reaches the image generating unit 10. Since the infra-red and UV components pass through the partially reflecting layer, they do not reach the image-generating unit 10.

The light beams LS1 radiated from the image generating unit 10 are polarized, so that they are almost totally reflected by the polarization layer 213. Since the spectrally partially reflecting layer 212 is matched to the light output by the image-generating unit 10 on the wavelength, said light passes through this with almost no attenuation. The mirror unit 3 also reflects light optimally with a specific polarization orientation. The polarization of the light output by the image generating unit 10 is correspondingly aligned. This means that the light beams LS1-LS3 radiated out from the image-generating unit 10 reach the eye 61 of the observer with their intensity that is scarcely reduced, whereas the interfering light that enters from the outside corresponding to arrow P1 is heavily attenuated by the mirror element 21 and thus gives rise to no damage, or only very little damage, in the generating unit 10.

Figure 3:
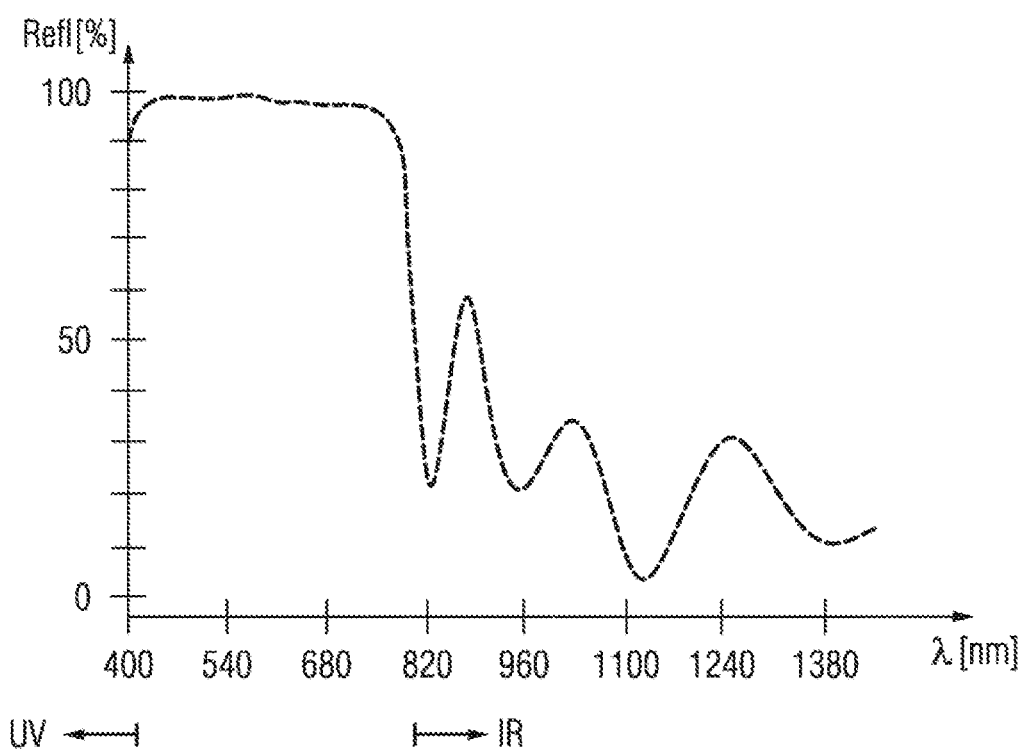
FIG. 3 shows the reflectivity of the spectrally partially reflecting layer.

FIG. 3 shows the reflectivity in percent plotted against the wavelength in nanometers of the spectrally partially reflecting layer 212. It can be seen that the reflectivity is almost 100% above 400 nm, and only falls away slightly up to about 800 nm. At about 820 nm the reflectivity reaches a trough of about 20%, then rises once again to about 50% and remains largely below a reflectivity of 30% above about 900 nm. Infra-red light is thus strongly reduced by the spectrally partially reflecting layer 212, while the visible light is almost entirely reflected. This is optimum for an image-generating unit 10 that radiates in the whole visible spectrum. If, on the other hand, this comprises light sources each with a fixed wavelength with little variation, it may thus be appropriate to use a partially reflecting layer that only reflects in these wavelength ranges and allows the light of other wavelengths to pass through.

A corresponding reflectivity against wavelength is not illustrated here, but the expert will easily picture what such a characteristic looks like. The spectrally partially reflecting layer 212 illustrated thus has a bandpass characteristic. Applicable in such cases as those in which different light sources are used in the same or different variants of image-generating units 10. The bandpass characteristic is always appropriate regardless of the actual wavelength used. A greater wavelength selectivity, on the other hand, yet again reduces the interfering light incident on the image-generating unit 10.

The substrate 211 in FIG. 2 is opaque. Light passed through by the spectrally partially reflecting layer is thus absorbed by the substrate 211. According to one embodiment, the substrate 211 has a high mass. In this case, its thickness is significantly greater than is shown in the illustration.

Figure 4:
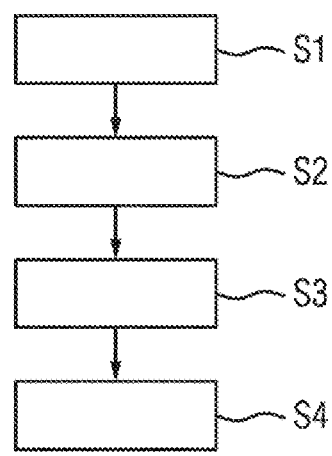
FIG. 4 shows a flow diagram of a manufacturing method.

FIG. 4 shows a flow diagram of a manufacturing method of a head-up display according to the invention. The substrate 211, which has a plane surface 215, is provided in step S1. A spectrally partially reflecting layer 212 is vapor-deposited onto the surface 215 in step S2. An absorptive polarization layer 213 is then laminated onto the spectrally partially reflecting layer 212 in step S3. The mirror element 21 obtained in this way is inserted into a deflection unit 2 of the head-up display in step S4.

In other words, spectral filtering and a polarization filtering are combined in one component, the mirror element 21, without adding additional components to the head-up display. The mirror element 21 replaces a mirror which is in any case required at this location in the head-up display, and consists of a substrate 211 that can be transparent, opaque or partially transparent, onto which a layer 212 that is reflective for the light transmitted from the light source of the image-generating unit 10, and that transmits or absorbs the spectral components outside this range, is applied. An absorbing polarizer, the polarization layer 213, which only transmits the polarization of the light source of the image-generating unit 10 and absorbs light of other polarizations, is applied to this layer 212.

The proposed combination enables the entire protective function in one component, without adding additional components to the head-up display. A compact implementation is thereby enabled, and the number of optical boundary surfaces is reduced, whereby a higher efficiency is achieved, and back-reflections are avoided. Through the application of the absorbing polarizer, the polarization layer 213, to a high-mass substrate 211, the heat absorbed from the sun can be dissipated more easily. The invention is also suitable for other optical systems with mirrors that require polarization filtering.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the scope of the following claims.

The invention claimed is:

1. A head-up display comprising:
an image-generating unit;
a mirror unit;
a deflection unit having a mirror element having a spectrally partially reflecting layer disposed on a substrate wherein light coming from the image-generating unit is reflected by the deflection unit to the mirror unit, and
an absorptive polarization layer disposed on the spectrally partially reflecting layer, wherein the absorptive polarization layer allows light through that has the same polarization orientation as the polarization layer and absorbs light of a different polarization, and wherein the absorptive polarization layer faces the image-generating unit.

2. The head-up display of claim 1, wherein the spectrally partially reflecting layer has a band-pass characteristic.

3. The head-up display of claim 1, wherein the spectrally partially reflecting layer reflects in wavelength ranges that are generated by the image-generating unit.

4. The head-up display of claim 1, wherein the substrate has a plane surface, the spectrally partially reflecting layer is a layer vapor-deposited onto the substrate, and the polarization layer is a laminated membrane.

5. The head-up display of claim 1, wherein the substrate is opaque, wherein the substrate and the absorptive polarizing layer are on opposing side of the reflecting layer such that there is uniform heat distribution across the substrate, reflecting layer and absorptive polarizing layer.

6. The head-up display of claim 1, wherein the substrate has a large mass.

7. The head-up display of claim 1, wherein the mirror unit and the deflection unit are on opposing sides of an outlet opening.

8. The head-up display of claim 1, wherein the wavelength of the spectrally partially reflecting layer is between 400 nm and 900 nm.

9. The head-up display of claim 1, wherein the mirror unit reflects the light from the deflection unit toward an eye of a driver.

10. The head-up display of claim 1, wherein the mirror unit and the mirror element are non-parallel to one another.

11. A method for the manufacture of a head-up display comprising:
providing a substrate of a mirror element with a plane surface;
vapor-depositing a spectrally partially reflecting layer onto the surface of the substrate;
laminating an absorptive polarization layer onto the spectrally partially reflecting layer, wherein the absorptive polarization layer is facing an image-generating unit and allows light through that has the same polarization orientation as the polarization layer and absorbs light of a different polarization; and
incorporating the mirror element obtained in this way into a deflection unit of the head-up display wherein light coming from an image-generating unit is reflected by the deflection unit to a mirror unit.

12. A mirror element comprising:
a spectrally partially reflecting layer disposed on a substrate; and
an absorptive polarization layer disposed on the spectrally partially reflecting layer,
wherein the absorptive polarization layer facing an image-generating unit allows light from the image-generating unit through that has the same polarization orientation as the polarization layer and absorbs light of a different polarization, and wherein the light with the same polarization is reflected by the spectrally partially reflecting layer to a mirror unit.

13. The mirror element of claim 12, wherein the spectrally partially reflecting layer has a band-pass characteristic.

14. The mirror element of claim 12, wherein the spectrally partially reflecting layer reflects in wavelength ranges that are generated by an image-generating unit.

15. The mirror element of claim 12, wherein the substrate has a plane surface, the spectrally partially reflecting layer is a layer vapor-deposited onto the substrate, and the polarization layer is a laminated membrane.

16. The mirror element of claim 12, wherein the substrate is opaque wherein the substrate and the absorptive polarizing layer are on opposing side of the reflecting layer such that there is uniform heat distribution across the substrate, reflecting layer and absorptive polarizing layer.

17. The mirror element of claim 12, wherein the substrate has a large mass.

18. The mirror element of claim 12, wherein the wavelength of the spectrally partially reflecting layer is between 400 nm and 900 nm.

* * * * *